(12) United States Patent
Allen et al.

(10) Patent No.: US 8,742,010 B2
(45) Date of Patent: Jun. 3, 2014

(54) TWO-COMPONENT WATERBORNE POLYURETHANE COATINGS

(75) Inventors: Kathy Allen, Scenery Hill, PA (US); Jeanette Eastman, Pittsburgh, PA (US); Kurt E. Best, Sewickley, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 475 days.

(21) Appl. No.: 12/757,283

(22) Filed: Apr. 9, 2010

(65) Prior Publication Data

US 2011/0251332 A1    Oct. 13, 2011

(51) Int. Cl.
*C08G 18/08*    (2006.01)
*C08G 18/28*    (2006.01)

(52) U.S. Cl.
USPC .......................................... 524/589; 524/590

(58) Field of Classification Search
USPC ................................. 524/589, 590
See application file for complete search history.

(56) References Cited

U.S. PATENT DOCUMENTS

| | | |
|---|---|---|
| 4,511,682 A | 4/1985 | Mayer et al. |
| 4,515,919 A | 5/1985 | Bradley et al. |
| 5,075,370 A | 12/1991 | Kubitza et al. |
| 5,252,696 A | 10/1993 | Laas et al. |
| 5,304,400 A | 4/1994 | Dhein et al. |
| 5,464,494 A | 11/1995 | Bolte et al. |
| 5,480,480 A | 1/1996 | Lynch et al. |
| 5,608,000 A | 3/1997 | Duan et al. |
| 5,750,613 A | 5/1998 | Blum et al. |
| 5,798,409 A | 8/1998 | Ho |
| 5,820,936 A | 10/1998 | Giannotti |
| 5,868,902 A * | 2/1999 | Howland et al. .............. 162/140 |
| 6,106,950 A | 8/2000 | Searle et al. |
| 6,204,323 B1 | 3/2001 | Wamprecht et al. |
| 6,426,414 B1 | 7/2002 | Laas et al. |
| 6,767,958 B2 | 7/2004 | Laas et al. |
| 7,205,356 B2 | 4/2007 | Gurtler et al. |
| 2004/0034162 A1* | 2/2004 | Laas et al. ..................... 524/589 |
| 2004/0161566 A1* | 8/2004 | Truog et al. .................. 428/40.1 |
| 2004/0197572 A1 | 10/2004 | Bell |
| 2004/0225051 A1 | 11/2004 | Moy |
| 2005/0288431 A1 | 12/2005 | Gindin et al. |
| 2006/0167203 A1 | 7/2006 | Endo et al. |

FOREIGN PATENT DOCUMENTS

WO    WO 01/62819 A1    8/2001

* cited by examiner

*Primary Examiner* — Aiqun Li
(74) *Attorney, Agent, or Firm* — Donald R. Palladino; Robert S. Klemz

(57) ABSTRACT

A polyaziridine introduced into a two-component waterborne polyurethane dispersion coating system increases the cure rate of a coating composition formed from the coating system.

18 Claims, No Drawings

TWO-COMPONENT WATERBORNE POLYURETHANE COATINGS

TECHNICAL FIELD

The present disclosure is directed to two-component waterborne polyurethane coatings and their related processes.

BACKGROUND

The use of water as a solvent or carrier for polyurethane coatings has increased due to health, safety, and environmental concerns over the effects of volatile organic compounds (VOCs) and hazardous air pollutants (HAPs). As a result, waterborne polyurethane coating technologies have emerged as alternatives to solvent-borne coating technologies.

Waterborne polyurethane coatings may exhibit many properties that are comparable to solvent-borne polyurethane coatings. However, various properties of waterborne polyurethane coatings may fall short when compared to solvent-borne coatings. For instance, two-component waterborne polyurethane coatings may exhibit slower cure rates when compared to two-component solvent-borne polyurethane coatings.

SUMMARY

Embodiments disclosed herein are directed to a process for increasing the cure rate of a two-component waterborne polyurethane dispersion coating. The process comprises introducing a polyaziridine into a two-component waterborne polyurethdne dispersion coating system. The coating system comprises a hydrophilically-modified water-dispersible polyisocyanate; a polyol dispersed in water, optionally, in the presence of one or more organic solvents; and, optionally, one or more additives or auxiliary agents. The introduction of the polyaziridine into the coating system decreases the time-to-cure by at least 35 percent.

Other embodiments disclosed herein are directed to a two-component waterborne polyurethane dispersion coating system. The coating system comprises a hydrophilically-modified water-dispersible polyisocyanate; a polyol dispersed in water, optionally, in the presence of one or more organic solvents; a polyaziridine; and, optionally, one or more additives or auxiliary agents. The time-to-cure of a coating composition formed from the coating system comprising a polyaziridine is decreased by at least 35 percent.

It is understood that the invention is not limited to the embodiments disclosed in this Summary. The invention is intended to cover modifications that are within the scope of the invention as defined solely by the Claims.

DESCRIPTION

It is to be understood that certain descriptions of the disclosed embodiments have been simplified to illustrate only those steps, elements, features, and aspects that are relevant to a clear understanding of the disclosed embodiments, while eliminating, for purposes of clarity, other steps, elements, features, and aspects. Persons having ordinary skill in the art, upon considering the present description of the disclosed embodiments, will recognize that other steps, elements, and/or features may be desirable in a particular implementation or application of the disclosed embodiments. However, because such other steps, elements, and/or features may be readily ascertained by persons having ordinary skill upon considering the present description of the disclosed embodiments, and are not necessary for a complete understanding of the disclosed embodiments, a description of such steps, elements, and/or features is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about". Accordingly, unless indicated to the contrary, any numerical parameters set forth in the following description may vary depending on the desired properties one seeks to obtain in the systems, compositions, and processes according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant(s) reserves the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. §112 and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used.

Any patent, publication, or other disclosure material, in whole or in part, that is said to be incorporated by reference herein, is incorporated herein in its entirety, but only to the extent that the incorporated material does not conflict with existing definitions, statements, or other disclosure material expressly set forth in this disclosure. As such, and to the extent necessary, the express disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Two-component waterborne polyurethane systems and coatings may represent a low-VOC and low-HAP alternative to solvent-borne coatings in a number of application areas. The use of hydrophilically-modified water-dispersible polyisocyanates and polyols or polyamines enables the formation of homogenous and co-solvent free or low-solvent aqueous mixtures of binder and hardener/crosslinker. Aqueous mixtures comprising binder and hardener/crosslinker (and optional additives or auxiliary agents) may be applied to substrates and allowed to cure to form polyurethane coatings, such as, for example, lacquers, paints, and adhesives.

As used herein, the term "two-component" refers to a coating system or composition comprising at least two separate compositions that must be stored in separate containers owing to their mutual reactivity. For instance, two-component polyurethane coating systems and compositions may comprise a hardener/crosslinker component including an isocyanate-functional compound and a separate binder component including a compound that is reactive with isocyanate groups, such as, for example, a hydroxy-functional or amino-functional compound. The two separate components are generally not mixed until shortly before application. When the two separate components are mixed and applied, the mutually reactive compounds in the two components react to form a cured coating.

As used herein, the term "coating system" refers to a set of chemical components that may be mixed to form an active coating composition that may be applied and cured to form a coating. As used herein, the term "coating composition" refers to a mixture of chemical components that will cure and form a coating when applied. Accordingly, a coating composition may be formed from a coating system by mixing the chemical components comprising the coating system. Furthermore, when a list of constituents is provided herein that are individually suitable for forming the components of the coating system or coating composition discussed herein, it should be understood that various combinations of two or more of those constituents, combined in a manner that would be known to those of ordinary skill in the art reading the present specification, may be employed and is contemplated.

As used herein, the term "cured" refers to the condition of a liquid coating composition in which an applied film of the coating composition is at least set-to-touch as defined in ASTM D 5895—*Standard Test Methods for Evaluating Drying or Curing During Film Formation of Organic Coatings Using Mechanical Recorder*, which is hereby incorporated by reference herein. As used herein, the terms "cure" and "curing" refer to the progression of an applied liquid coating composition from the liquid state to a cured state. The terms "cured", "cure", and "curing" encompass drying of coating compositions through solvent evaporation and chemical crosslinking of components in coating compositions.

As used herein, the term "polyurethane" refers to polymeric or oligomeric materials comprising urethane groups, urea groups, or both. Accordingly, as used herein, the term "polyurethane" is synonymous with the terms polyurea, poly (urethane/urea), and modifications thereof. The term "polyurethane" also refers to crosslinked polymer networks in which the crosslinks comprise urethane and/or urea linkages, and/or the constituent polymer chains comprise urethane and/or urea linkages.

Two-component coating systems and compositions comprise at least two mutually reactive compounds. The two mutually reactive compounds may be referred to as a binder and a hardener/crosslinker. As used herein, the term "binder" refers to the larger molecular weight reactive compound comprising a two-component coating system or composition. As used herein, the terms "hardener" and "crosslinker" are synonymous and refer to the smaller molecular weight reactive compound. For example, in a two-component polyurethane coating system or composition, the binder may comprise a polymeric polyol and the hardener/crosslinker may comprise a polyisocyanate. When mixed, a polyol binder and a polyisocyanate hardener/crosslinker may react to form a crosslinked polymer network comprising urethane and/or urea linkages.

As used herein, the term "dispersion" refers to a composition comprising a discontinuous phase distributed throughout a continuous phase. For example, "waterborne dispersion" and "aqueous dispersion" refer to compositions comprising particles or solutes distributed throughout liquid water. Waterborne dispersions and aqueous dispersions may also include one or more co-solvents in addition to the particles or solutes and water. As used herein, the term "dispersion" includes, for example, colloids, emulsions, suspensions, sols, solutions (i.e., molecular or ionic dispersions), and the like.

As used herein, the term "polyisocyanate" refers to compounds comprising at least two free isocyanate groups. Polyisocyanates include diisocyanates and diisocyanate reaction products comprising, for example, biuret, isocyanurate, uretdione, urethane, urea, iminooxadiazine dione, oxadiazine trione, carbodiimide, acyl urea, and/or allophanate groups. As used herein, the term "polyol" refers to compounds comprising at least two free hydroxy groups. Polyols include polymers comprising pendant and/or terminal hydroxy groups. As used herein, the term "polyamine" refers to compounds comprising at least two free amine groups. Polyamines include polymer comprising pendant and/or terminal amine groups.

As compared to two-component solvent-borne polyurethane coating systems and compositions, two-component waterborne polyurethane dispersion coating systems and compositions may exhibit a slower cure rate (i.e., a longer time-to-cure). The present inventors discovered that the introduction of a polyaziridine into a two-component waterborne polyurethane dispersion coating system or composition increases the cure rate of the coating composition (i.e., decreases the time-to-cure).

As used herein, the term "polyaziridine" refers to a compound comprising two or more aziridine (ethylene imine) groups. Aziridine groups react with nucleophilic materials that contain carboxy groups, amino groups, and hydroxy groups, for example. Polyaziridine compounds include tris-aziridinopropionate derivatives, such as, for example, tris-3-(1-aziridino)propionate derivatives.

Polyaziridines may be used to cross-link coalesced films formed from one-component waterborne polyurethane dispersions to improve final film properties such as chemical resistance and wear resistance. For example, aqueous one-component polyurethane dispersions may be stabilized with covalently linked carboxy groups. The carboxy groups may react with aziridine groups in polyaziridines to form an intermediate β-amino ester that rearranges to form a β-hydroxyamide. In this manner, for example, polyaziridines may be used to form crosslinks comprising β-hydroxyamide linkages.

Two-component waterborne polyurethane dispersions may comprise a polyisocyanate crosslinker that forms crosslinks comprising urethane and/or urea linkages with a binder comprising isocyanate-reactive groups. As a result, polyaziridines are not necessary to crosslink compositions formed from two-component waterborne polyurethane dispersions. However, as discovered by the present inventors, the introduction of a polyaziridine into a two-component waterborne polyurethane dispersion coating system or composition increases the cure rate of the coating composition.

In various embodiments, a two-component waterborne polyurethane dispersion coating system or composition may comprise a hardener/crosslinker comprising a water-dispersible polyisocyanate. A two-component waterborne polyurethane dispersion coating system or composition may also comprise a binder comprising a water-dispersible compound that is reactive with the polyisocyanate. The water-dispersible compound that is reactive with the polyisocyanate may comprise a polyol or a polyamine. The water-dispersible compound that is reactive with the polyisocyanate may be pre-dispersed in water. The cure rate of the two-component waterborne polyurethane dispersion coating system or composition may be increased by the introduction of one or more polyaziridines.

Water-dispersible polyisocyanates include polyisocyanates that may form an aqueous dispersion with the aid of organic co-solvents, protective colloids, and/or external emulsifiers under high shear conditions. Water-dispersible polyisocyanates also include polyisocyanates that are hydrophilically-modified with covalently linked internal emulsifiers.

The polyisocyanate hardener/crosslinker component of a two-component polyurethane coating system or composition may comprise any organic polyisocyanates having aliphatically, cycloaliphatically, araliphatically, and/or aromatically bound free isocyanate groups, which are liquid at room temperature or are dispersed in a solvent or solvent mixture at room temperature. In various embodiments, the polyisocyanate component may have a viscosity of from 10-15000 mPa·s at 23° C., 10-5000 mPa·s at 23° C., or 50-1000 mPa·s at 23° C. In various embodiments, the polyisocyanate component may comprise polyisocyanates or polyisocyanate mixtures having exclusively aliphatically and/or cycloaliphatically bound isocyanate groups with an (average) NCO functionality of 2.0-5.0 and a viscosity of from 10-5000 mPa·s at 23° C., 50-1000 mPa·s at 23° C., or 100-1000 mPa·s at 23° C.

In various embodiments, the polyisocyanate component may comprise polyisocyanates or polyisocyanate mixtures based on one or more aliphatic or cycloaliphatic diisocyanates, such as, for example, ethylene diisocyanate; 1,4-tetramethylene diisocyanate; 1,6-hexamethylene diisocyanate (HDI); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or IPDI); bis-(4-isocyanatocyclohexyl)methane ($H_{12}MDI$); cyclohexane 1,4-diisocyanate; bis-(4-isocyanato-3-methyl-cyclohexyl)methane; isomers of any thereof; or combinations of any thereof. In various embodiments, the polyisocyanate component may comprise polyisocyanates or polyisocyanate mixtures based on one or more aromatic diisocyanates, such as, for example, benzene diisocyanate; toluene diisocyanate (TDI); diphenylmethane diisocyanate (MDI); isomers of any thereof; or combinations of any thereof. In various embodiments, the polyisocyanate component may comprise a triisocyanate, such as, for example, 4-isocyanatomethyl-1,8-octane diisocyanate (triisocyanatononane or TIN); isomers thereof; or derivatives thereof.

Additional polyisocyanates (including various diisocyanates) that may also find utility in the disclosed two-component waterborne polyurethane coating systems and compositions may include the polyisocyanates described in U.S. Pat. Nos. 5,075,370; 5,304,400; 5,252,696; 5,750,613; and 7,205,356, each of which is incorporated by reference herein. Combinations of any of the above-identified and incorporated polyisocyanates may also be used to form two-component waterborne polyurethane coating systems and compositions as disclosed herein.

The di- and tri-isocyanates indicated may be used as such, or as derivative polyisocyanates comprising biuret, isocyanurate, uretdione, urethane, urea, iminooxadiazine dione, oxadiazine trione, carbodiimide, acyl urea, and/or allophanate groups. In various embodiments, derivative polyisocyanates comprising biuret, isocyanurate, uretdione, urethane, iminooxadiazine dione, oxadiazine trione, carbodiimide, acyl urea, and/or allophanate groups are included in the polyisocyanate component. In various embodiments, the polyisocyanate component comprises one or more of the above-identified structural groups prepared from IPDI, HDI, $H_{12}MDI$, and/or cyclohexane 1,4-diisocyanate.

The polyisocyanate component may be hydrophilically-modified to be water-dispersible. Hydrophilically-modified water-dispersible polyisocyanates are obtainable, for example, by covalent modification with an internal emulsifier comprising anionic, cationic, or nonionic groups.

Polyether urethane type water-dispersible polyisocyanates may be formed, for example, from a reaction between polyisocyanates and less than stoichiometric amounts of monohydric polyalkylene oxide polyether alcohols. The preparation of such hydrophilically-modified polyisocyanates is described, for example, in U.S. Pat. No. 5,252,696, which is incorporated by reference herein. Polyether allophanate type water-dispersible polyisocyanates may be formed, for example, from a reaction between a polyalkylene oxide polyether alcohol and two polyisocyanate molecules under allophanation conditions. The preparation of such hydrophilically-modified polyisocyanates is described, for example, in U.S. Pat. No. 6,426,414, which is incorporated by reference herein. The polyalkylene oxide polyether alcohol used to prepare polyether type hydrophilically-modified water-dispersible polyisocyanates may comprise, for example, polyethylene oxide residues and/or polypropylene oxide resides.

Polyisocyanates may also be covalently modified with ionic or potentially ionic internal emulsifying groups to form hydrophilically-modified water-dispersible polyisocyanates. The ionic or potentially ionic groups may be cationic or anionic. As used herein, the term "ionic or potentially ionic group" refers to a chemical group that is nonionic under certain conditions and ionic under certain other conditions. For example, in various embodiments, the ionic group or potentially ionic group may comprise a carboxylic acid group; a carboxylate group; a sulfonic acid group; a sulfonate group; a phosphonic acid group; a phosphonate group; or combinations of any thereof. In this regard, for example, carboxylic acid groups, sulfonic acid groups, and phosphonic acid groups are potentially ionic groups, whereas, carboxylate groups, sulfonate groups, and phosphonate groups are ionic groups in the form of a salt, such as, for example, a sodium salt.

For example, carboxylate (carboxylic acid) groups, sulfonate (sulfonic acid) groups, or phosphonate (phosphonic acid) groups may be covalently introduced into polyisocyanates to form hydrophilically-modified water-dispersible polyisocyanates. The ionic or potentially ionic groups may be introduced through a reaction between the isocyanate groups of the polyisocyanate and less than stoichiometric amounts of amino-functional or hydroxy-functional carboxylic acids, sulfonic acids, phosphonic acids, or salts thereof. Examples include, but are not limited to dimethylolpropionic acid (DMPA), N-(2-aminoethyl)-2-aminoethane sulfonic acid (AAS); N-(2-aminoethyl)-2-aminopropionic acid; 2-(cyclohexyl-amino)-ethane sulfonic acid; 3-(cyclohexyl-amino)-1-propane sulfonic acid (CAPS); 2-aminoethylphosphonic acid; or the salts thereof.

If free carboxylic acids, sulfonic acids, or phosphonic acids are incorporated in the polyisocyanate, then the acids may be neutralized with a neutralizing agent, such as, for example, tertiary amines, including, but not limited to, trialkyl-substituted tertiary amines. The preparation of hydrophilically-modified water-dispersible polyisocyanates is described, for example, in U.S. Pat. No. 6,767,958, which is incorporated by reference herein. Water-dispersible polyisocyanate mixtures based on triisocyanatononane (TIN) are described in International Patent Application Publication No. WO-01/62819, which is incorporated by reference herein.

The NCO content of nonionic type hydrophilically-modified water-dispersible polyisocyanates may be from 5 to 25 weight percent of the polyisocyanate molecule. The NCO content of ionic type hydrophilically-modified water-dispersible polyisocyanates may be from 4 to 26 weight percent of the polyisocyanate molecule.

The polyisocyanates may also be partially blocked with compounds that are reversibly reactive with isocyanate groups. Suitable blocking agents for polyisocyanates include, for example, monohydric alcohols such as methanol, ethanol, butanol, hexanol, cyclohexanol, benzyl alcohol, oximes such as acetoxime, methyl ethyl ketoxime, cyclohexanone oxime, lactams such as ε-caprolactam, phenols, amines such as diisopropylamine or dibutylamine, dimethylpyrazole or triazole, as well as malonic acid dimethyl ester, malonic acid diethyl ester or malonic acid dibutyl ester.

Exemplary polyisocyanates that find utility in the disclosed two-component waterborne polyurethane dispersion coating systems and compositions include, but are not limited to, the Bayhydur® products (Bayer MaterialScience LLC).

In various embodiments, a two-component waterborne polyurethane dispersion coating system or composition may comprise a hardener/crosslinker comprising a water-dispersible polyisocyanate. A two-component waterborne polyurethane dispersion coating system or composition may also comprise a binder comprising a water-dispersible compound that is reactive with the polyisocyanate. The water-dispersible compound that is reactive with the polyisocyanate may comprise a polyol or a polyamine. The water-dispersible compound that is reactive with the polyisocyanate may be pre-dispersed in water.

The following, for example, may be suitable binders that are reactive with polyisocyanates: polymers formed from olefinically unsaturated monomers (polyacrylic polyols); polymers formed from combinations of diols and dicarboxylic acids (polyester polyols); polymers formed from combinations of diols, dicarboxylic acids, and diisocyanates (polyurethane polyols); polymers formed from the addition of alkylene oxides to starter molecules (polyether polyols); polycarbonate polyols; and polycaprolactone polyols. Hybrid systems prepared from the polyol classes indicated above may also find utility as binders in two-component waterborne polyurethane dispersion coating systems or compositions. For example, polyacrylate-polyester polyols, polyacrylate-polyurethane polyols, polyester-polyurethane polyols, or polyether-polyurethane polyols may find utility as binders.

Polyol binders may also be covalently modified with nonionic, ionic or potentially ionic internal emulsifying groups to form hydrophilically-modified water-dispersible polyols. For example, hydrophilically-modified water-dispersible polyacrylic polyols comprising covalently incorporated carboxylate and/or sulfonate groups are described, for example, in U.S. Pat. Nos. 5,075,370; 5,304,400; and 5,750,613, each of which is incorporated by reference herein. Other polyol binders are described, for example, in U.S. Pat. No. 6,204,323, which is incorporated by reference herein.

In various embodiments, the polyol binder may have a molecular weight $M_n$ (number average), determinable by gel permeation chromatography, of 500-50000 or 1000-10000. In various embodiments, the polyol binder may have a hydroxyl value of 16.5-264 mg KOH/g solid resin or 33-165 mg KOH/g solid resin. In various embodiments, the polyol binder may have an acid value (in relation to non-neutralized sulfonic acid groups and/or carboxylic acid groups) of 0-150 mg KOH/g solid resin or 0-100 mg KOH/g solid resin. In various embodiments, the polyol binder may have a sulfonate group and/or carboxylate group content of 5-417 milliequivalents per 100 g solids or 24-278 milliequivalents per 100 g solids.

Generally, binders that are water-dispersible and that have groups which are reactive to isocyanates are suitable for use in two-component waterborne polyurethane dispersion coating systems and compositions. In various embodiments, the binder may comprise an aqueous polyacrylic polyol dispersion, wherein the polyol comprises carboxylate and/or sulfonate groups. In various embodiments, the binder may be in the form of a 10-60 weight percent or 20-50 weight percent aqueous dispersion, which may have a viscosity of 10-10000 or 100-10000 mPa·s at 23° C., and/or pH values of from 5-10, 6-9, or 7-8.

Exemplary binders that find utility in the disclosed two-component waterborne polyurethane dispersion coating systems and compositions include, but are not limited to, the Bayhydrol® products (Bayer MaterialScience, LLC).

In various embodiments, the cure rate of the two-component waterborne polyurethane dispersion coating system or composition may be increased by the introduction of one or more polyaziridines. In various embodiments, the cure rate of a two-component waterborne polyurethane dispersion coating system or composition may be increased by the introduction of one or more tris-1-aziridinopropionate derivatives. In various embodiments, the cure rate of a two-component waterborne polyurethane dispersion coating system or composition may be increased by the introduction of a polyaziridine selected from the group consisting of trimethyloipropane tris-(1-(2-methyl)aziridino)propionate (TTMAP), trimethyloipropane tris-3-(1-aziridinopropionate) (TTAP), pentaerythritol tris-3-(1-aziridinopropionate) (PTAP), and combinations of any thereof.

In various embodiments, the cure rate of a two-component waterborne polyurethane dispersion coating system or composition may be increased by the introduction of one or more polyaziridines in quantities of 0.10-1.50 percent by weight of the coating system or composition. In various embodiments, the cure rate of a two-component waterborne polyurethane dispersion coating system or composition may be increased by the introduction of one or more polyaziridines in quantities of 0.10-1.50, 0.10-1.25, 0.10-1.00, 0.10-0.85, 0.10-0.65, 0.10-0.50, or 0.10-0.25 percent by weight of the coating system or composition. In various embodiments, the cure rate of a two-component waterborne polyurethane dispersion coating system or composition may be increased by the introduction of one or more polyaziridines in quantities of 0.25-1.50, 0.25-1.25, 0.25-1.00, 0.25-0.85, 0.25-0.65, or 0.25-0.50 percent by weight of the coating system or composition.

In various embodiments, the cure rate of a two-component waterborne polyurethane dispersion coating system or composition may be increased by the introduction of one or more polyaziridines in quantities of 0.50-1.50, 0.50-1.25, 0.50-1.00, 0.50-0.85, 0.50-0.65 percent by weight of the coating system or composition. In various embodiments, the cure rate of a two-component waterborne polyurethane dispersion coating system or composition may be increased by the introduction of one or more polyaziridines in quantities of 0.65-1.50, 0.65-1.25, 0.65-1.00, or 0.65-0.85 percent by weight of the coating system or composition. In various embodiments, the cure rate of a two-component waterborne polyurethane dispersion coating system or composition may be increased by the introduction of one or more polyaziridines in quantities of 0.85-1.50, 0.85-1.25, or 0.85-1.00 percent by weight of the coating system or composition.

In certain embodiments, various blends of two or more polyaziridines may be employed. For example, in various embodiments, equal parts by weight of two polyaziridines may be introduced into a two-component waterborne polyurethane dispersion coating system or composition to increase the cure rate. In various embodiments, two polyaziridines in a weight ratio of 4:1, 3:1, or 2:1, may be introduced into a two-component waterborne polyurethane dispersion coating system or composition to increase the cure rate.

In various embodiments, a mixture of TTMAP and TTAP may be introduced into a two-component waterborne polyurethane dispersion coating system or composition to increase the cure rate. In various embodiments, the weight ratio of TTMAP to TTAP introduced into a two-component waterborne polyurethane dispersion coating system or composition to increase the cure rate may be 4:1, 3:1, 2:1, 1:1, 1:2, 1:3, or 1:4.

In various embodiments, the time-to-cure, measured as set-to-touch time or hard-dry time (ASTM D 5895), may be decreased by at least 35 percent due to the introduction of one or more polyaziridines. In various embodiments, the time-to-cure, measured as set-to-touch time or hard-dry time (ASTM D 5895), may be decreased by at least 90 percent due to the introduction of one or more polyaziridines. In various embodiments, the time-to-cure, measured as set-to-touch time or hard-dry time (ASTM D 5895), may be decreased by at least 35, 50, 60, 70, 80, 85, or 90 percent due to the introduction of one or more polyaziridines.

In addition to a polyisocyanate hardener/crosslinker and a binder (e.g., polyol or polyamine), two-component waterborne polyurethane dispersion coating systems or compositions may comprise conventional auxiliary agents or additives appropriate for the system or composition end use. For instance, in lacquer, paint, and/or adhesive applications, various auxiliary agents or additives may include, but are not limited to, defoamers, rheology modifiers (e.g., thickeners), leveling agents, flow promoters, pigments, dispersing agents, catalysts, anti-skinning agents, anti-sedimentation agents, and/or emulsifiers.

The two-component polyurethane systems disclosed herein may comprise water as the predominant solvent, and optionally, one or more organic solvents. Optional organic solvents may include, but are not limited to, acetone, xylene, butyl carbitol, butyl acetate, ethyl acetate, hexyl acetate mixtures, butyl glycol acetate, dipropylene glycol n-butyl ether, methoxypropyl acetate, hydrocarbons such as the Aromatic® solvents (Exxon Mobile Chemicals), propylene glycol monomethyl ether acetate, N-methylpyrrolidone, or combinations of any thereof. The organic solvents may be utilized, if at all, in limited quantities that emerge as necessary given the particular chemical components of a specific embodiment of a two-component waterborne polyurethane dispersion coating system or composition as described herein.

In various embodiments, a two-component waterborne polyurethane dispersion coating system may comprise at least two mixtures. A first mixture may comprise a binder and one or more auxiliary agents or additives and a second mixture may comprise a hardener/crosslinker. The first mixture and the second mixture are generally contained in separate containers and are not combined until shortly before application. In various embodiments, a polyaziridine may be introduced into the first mixture, or vice versa, before the first mixture and the second mixture are combined. In various embodiments, a polyaziridine may be introduced into the second mixture, or vice versa, before the first mixture and the second mixture are combined. In various embodiments, a polyaziridine may be introduced into a combination of the first mixture and the second mixture.

In various embodiments, the disclosed processes may comprise introducing a polyaziridine into a coating system by mixing the polyaziridine with a binder before a hardener/crosslinker is mixed to form a coating composition. In various embodiments, the disclosed processes may comprise introducing a polyaziridine into a coating system by mixing the polyaziridine with a hardener/crosslinker before the hardener/crosslinker is mixed with a binder to form a coating composition. In various embodiments, disclosed processes may comprise introducing a polyaziridine into a coating system after a binder and a hardener/crosslinker are mixed to form a coating composition.

The ratio of isocyanate groups to hydroxyl groups (NCO:OH ratio) in the hardener/crosslinker and binder components, respectively, may be determined based on the particular chemistry and/or the specific application for a two-component waterborne polyurethane dispersion coating system or composition as described herein. For example, an NCO:OH ratio of 0.5:1 to 5:1 may be suitable for various lacquer, paint, and/or adhesive applications. In various embodiments, an NCO:OH ratio of 1.5:1 to 3:1 may be suitable.

Lacquers, paints, adhesives, and other formulations may be prepared from the two-component polyurethane systems as disclosed herein by methods which are known in the art. In various embodiments, the consistency of the component comprising the hardener/crosslinker and the consistency of the component comprising the binder may facilitate a simple mixing together of the components. One or more polyaziridines may be introduced into the component comprising the hardener/crosslinker or the component comprising the binder. One or more polyaziridines may be introduced before, during, or after the two components are mixed to form a reactive coating composition. Optionally, one or more auxiliary agents, additives, or organic solvents may be added to the hardener/crosslinker component and/or the binder component, before, during, or after the components are mixed to form a reactive coating composition.

Two-component waterborne polyurethane systems as described herein may comprise, by total weight, 10-55 percent hardener/crosslinker, 40-75 percent binder, 10-20 percent auxiliary agents/additives, and 0.10-1.50 percent polyaziridine(s).

The two-component waterborne polyurethane coating systems and compositions as described herein may be suitable for all areas of application in which water-based coating systems are used, such as, for example, coating of mineral building material surfaces, lacquering and sealing of wood and wood materials, coating of metallic surfaces (metal coating), coating and lacquering of asphalt-containing or bitumen-containing coverings, lacquering and sealing of diverse plastics surfaces (plastics coating), under coats, high-gloss top coats, as well as various adhesive applications. The two-component waterborne polyurethane coating systems and compositions may be used for the manufacture of paints, primers, fillers, pigmented lacquers and clear coat lacquers, as well as one-coat lacquers which are used in one-off and production line applications, for example, in the fields of industrial lacquering, and automotive original and repair lacquering.

The two-component waterborne polyurethane coatings may be applied by a variety of spraying processes, such as, for example, compressed air, HVLP, airless, air-mix, or electrostatic spraying processes. The coating compositions may also be applied by other methods, such as, for example, by brushing, roller application, or knife coating.

The illustrative and non-limiting examples that follow are intended to further describe the embodiments presented herein without restricting their scope. Persons having ordinary skill in the art will appreciate that variations of the Examples are possible within the scope of the invention as defined solely by the claims. All parts and percents are by weight unless otherwise indicated.

EXAMPLES

Example 1

Four (4) two-component waterborne polyurethane dispersion coating compositions were prepared. Each composition had a different quantity of a polyaziridine. The compositions were formed from the raw material formulations listed in Table 1 (weight percentages based on the total weight of the compositions).

TABLE 1

| Raw Material | A | B | C | D |
|---|---|---|---|---|
| Bayhydrol ® XP 2542 | 46.88 | 46.76 | 46.64 | 46.41 |
| PFAZ ™ 322 | 0.00 | 0.25 | 0.50 | 1.00 |
| Baysilone ® Paint Additive VP AI 3468 | 0.32 | 0.32 | 0.32 | 0.32 |
| DSX ® 1514 (8% in DI water) | 2.28 | 2.28 | 2.27 | 2.26 |
| Tego ® Foamex 822 | 0.14 | 0.13 | 0.13 | 0.13 |
| Water, DI | 9.61 | 9.57 | 9.55 | 9.50 |
| Bayhydur ® XP 2547 | 40.78 | 40.69 | 40.58 | 40.38 |

Bayhydrol® XP 2542 (Bayer MaterialScience LLC) is a hydrophilically-modified aqueous polyacrylic polyol dispersion having a solids content of 48-51 weight percent and a viscosity of approximately 1000-3500 mPa·s at 23° C. PFAZ™ 322 (Bayer MaterialScience LLC) is a commercial trade name for TTMAP. Baysilone® Paint Additive VP AI 3468 (Bayer MaterialScience LLC) is an auxiliary agent/additive that promotes flow and leveling of films. DSX® 1514 (Cognis) is a nonionic rheology modifier. Tego® Foamex 822 (Tego/Evonik) is a defoamer emulsion. Bayhydur® XP 2547 (Bayer MaterialScience LLC) is a water-dispersible hydrophilically-modified polyisocyanate based on HDI and having a solids content of 100%, an NCO content of approximately 23 weight percent, and a viscosity of approximately 600 mPa·s at 23° C.

The compositions were formed by introducing the raw materials into a mixing vessel in the order listed in Table 1. The Bayhydur® XP 2547 hardener/crosslinker was added to the mixtures including the Bayhydrol® XP 2542 binder, the PFAZ 322 polyaziridine, and the auxiliary agents/additives shortly before application of the compositions. The compositions exhibited the properties listed in Table 2.

TABLE 2

| Property | A | B | C | D |
|---|---|---|---|---|
| % NCO | 6.25 | 6.24 | 6.22 | 6.19 |
| Mix ratio (vol) | 1.61:1 | 1.60:1 | 1.59:1 | 1.57:1 |
| NCO:OH | 3.00 | 3.00 | 3.00 | 3.00 |
| P/B | 0 | 0 | 0 | 0 |
| PVC | 0 | 0 | 0 | 0 |
| VOC (lbs/gal) | 1.27 | 1.26 | 1.26 | 1.25 |
| Volume solids (%) | 61.35 | 61.45 | 61.55 | 61.74 |

TABLE 2-continued

| Property | A | B | C | D |
|---|---|---|---|---|
| Weight solids (%) | 64.69 | 64.78 | 64.87 | 65.04 |
| Weight/volume (lbs/gal) | 9.12 | 9.12 | 9.12 | 9.12 |

The compositions were drawn down on glass substrates after a methyl ethyl ketone (MEK) wipe. The Gardner Circular Drytimes (set-to-touch and hard-dry) were measured according to ASTM D 5895 at 23.8° C. and 50% relative humidity. The results are presented in Table 3.

TABLE 3

| | A | B | C | D |
|---|---|---|---|---|
| polyaziridine content (wt %) | 0 | 0.25 | 0.50 | 1.00 |
| set-to-touch time (hours) | 2.5 | 2.75 | 0.75 | 0.75 |
| hard-dry time (hours) | 8 | 5.25 | 3.25 | 1.5 |
| percentage decrease in set-to-touch time | — | −10.0 | 70.0 | 70.0 |
| percentage decrease in hard-dry time | — | 34.4 | 59.4 | 81.3 |

The addition of polyaziridine generally increased the cure rate of the two-component waterborne polyurethane dispersion coating composition as evidenced by the decreasing times for set-to-touch and hard-dry when compared to the composition with zero polyaziridine. The set-to-touch times for the compositions with zero polyaziridine and 0.25% polyaziridine (2.5 and 2.75 hours, respectively) are essentially the same for all practical purposes.

Example 2

Six (6) two-component waterborne polyurethane dispersion coating compositions were prepared. Five (5) of the compositions included 1.24-1.25 percent polyaziridine. The five (5) compositions containing polyaziridine comprised a combination of two different polyaziridines in different relative weight ratios. The compositions were formed from the raw material formulations listed in Table 4 (weight percentages based on the total weight of the compositions).

TABLE 4

| Raw Material | A | B | C | D | E | F |
|---|---|---|---|---|---|---|
| Bayhydrol ® XP 2542 | 46.88 | 46.29 | 46.29 | 46.29 | 46.29 | 46.29 |
| PFAZ ™ 322 | 0.00 | 1.25 | 0.94 | 0.62 | 0.31 | 0.00 |
| XAMA ® 220 | 0.00 | 0.00 | 0.31 | 0.62 | 0.94 | 1.25 |
| Baysilone ® Paint Additive VP AI 3468 | 0.32 | 0.32 | 0.32 | 0.32 | 0.32 | 0.32 |
| DSX ® 1514 (8% in DI water) | 2.28 | 2.25 | 2.25 | 2.25 | 2.25 | 2.25 |
| Tego ® Foamex 822 | 0.14 | 0.13 | 0.13 | 0.13 | 0.13 | 0.13 |
| Water, DI | 9.61 | 9.48 | 9.48 | 9.48 | 9.48 | 9.48 |
| Bayhydur ® XP 2547 | 40.78 | 40.28 | 40.28 | 40.28 | 40.28 | 40.28 |

XAMA® 220 (Bayer Material Science LLC) is a commercial trade name for TTAP. The compositions were formed by introducing the raw materials into a mixing vessel in the order listed in Table 4. The Bayhydur® XP 2547 hardener/crosslinker was added to the mixtures including the Bayhydrol® XP 2542 binder, the PFAZ™ 322 and/or XAMA® 220 polyaziridines, and the auxiliary agents/additives shortly before application of the compositions. The compositions exhibited the properties listed in Table 5.

TABLE 5

| Property | A | B | C | D | E | F |
|---|---|---|---|---|---|---|
| % NCO | 6.25 | 6.18 | 6.18 | 6.18 | 6.18 | 6.18 |
| Mix ratio (vol) | 1.61:1 | 1.55:1 | 1.55:1 | 1.55:1 | 1.55:1 | 1.55:1 |
| NCO: OH | 3.00 | 3.00 | 3.00 | 3.00 | 3.00 | 3.00 |
| P/B | 0 | 0 | 0 | 0 | 0 | 0 |
| PVC | 0 | 0 | 0 | 0 | 0 | 0 |
| VOC (lbs/gal) | 1.27 | 1.23 | 1.23 | 1.23 | 1.23 | 1.23 |
| Volume solids (%) | 61.35 | 63.14 | 63.14 | 63.14 | 63.14 | 63.14 |
| Weight solids (%) | 64.69 | 66.38 | 66.38 | 66.38 | 66.38 | 66.38 |
| Weight/volume (lbs/gal) | 9.12 | 9.13 | 9.13 | 9.13 | 9.13 | 9.13 |

The compositions were drawn down on glass substrates after an MEK wipe. The Gardner Circular Drytimes (set-to-touch and hard-dry) were measured according to ASTM D 5895 at 22.2° C. and 50% relative humidity (B—F) or 23.8° C. and 50% relative humidity (A). The results are presented in Table 6.

TABLE 6

| | A | B | C | D | E | F |
|---|---|---|---|---|---|---|
| polyazyridine content (weight ratio of TTMAP:TTAP) | 0:0 | 1.25:0 | 0.94:031 | 0.62:0.62 | 0.31:0.94 | 0:1.25 |
| set-to-touch time (hours) | 2.50 | 0.38 | 0.25 | 0.25 | 0.25 | 0.25 |
| hard-dry time (hours) | 8.00 | 1.25 | 0.75 | 1.25 | 1.00 | 0.88 |
| percentage decrease in set-to-touch time | — | 85.0 | 90.0 | 90.0 | 90.0 | 90.0 |
| percentage decrease in hard-dry time | — | 84.4 | 90.6 | 84.4 | 87.5 | 89.1 |

The addition of polyaziridine generally increased the cure rate of the two-component waterborne polyurethane dispersion coating composition as evidenced by the decreased times for set-to-touch and hard-dry when compared to the composition with zero polyaziridine. The addition of both TTMAP and TTAP generally increased the cure rate of the two-component waterborne polyurethane dispersion coating composition more than the addition of TTMAP alone. The addition of TTAP alone generally increased the cure rate of the two-component waterborne polyurethane dispersion coating composition more than the addition of TTMAP alone.

Example 3

Four (4) two-component waterborne polyurethane dispersion coating compositions were prepared. The compositions each included 1:1 weight ratios of TTMAP:TTAP. The compositions included zero polyaziridine (0:0), 0.42 percent polyaziridine (0.21:0.21), 0.84 percent polyaziridine (0.42:0.42), or 1.24 percent polyaziridine (0.62:0.62). The compositions were formed from the raw material formulations listed in Table 7 (weight percentages based on the total weight of the compositions).

TABLE 7

| Raw Material | A | B | C | D |
|---|---|---|---|---|
| Bayhydrol ® XP 2542 | 46.88 | 46.68 | 46.48 | 46.29 |
| PFAZ ™ 322 | 0.00 | 0.21 | 0.42 | 0.62 |
| XAMA ® 220 | 0.00 | 0.21 | 0.42 | 0.62 |
| Baysilone ® Paint Additive VP AI 3468 | 0.32 | 0.32 | 0.32 | 0.32 |
| DSX ® 1514 (8% in DI water) | 2.28 | 2.27 | 2.26 | 2.25 |
| Tego ® Foamex 822 | 0.14 | 0.14 | 0.14 | 0.14 |
| Water, DI | 9.61 | 9.57 | 9.53 | 9.49 |
| Bayhydur ® XP 2547 | 40.78 | 40.61 | 40.44 | 40.27 |

The compositions were formed by introducing the raw materials into a mixing vessel in the order listed in Table 7. The Bayhydur® XP 2547 hardener/crosslinker was added to the mixtures including the Bayhydrol® XP 2542 binder, the PFAZ™ 322 and XAMA® 220 polyaziridines, and the auxiliary agents/additives shortly before application of the compositions. The compositions exhibited the properties listed in Table 8.

TABLE 8

| Property | A | B | C | D |
|---|---|---|---|---|
| % NCO | 6.25 | 6.23 | 6.2 | 6.17 |
| Mix ratio (vol) | 1.60:1 | 1.59:1 | 1.57:1 | 1.55:1 |
| NCO: OH | 3.00 | 3.00 | 3.00 | 3.00 |
| P/B | 0 | 0 | 0 | 0 |
| PVC | 0 | 0 | 0 | 0 |
| VOC (lbs/gal) | 1.25 | 1.24 | 1.23 | 1.23 |
| Volume solids (%) | 62.66 | 62.82 | 62.97 | 63.12 |
| Weight solids (%) | 65.94 | 66.08 | 66.23 | 66.36 |
| Weight/volume (lbs/gal) | 9.13 | 9.13 | 9.13 | 9.13 |

The compositions were drawn down on glass substrates after an MEK wipe. The Gardner Circular Drytimes (set-to-touch and hard-dry) were measured according to ASTM D 5895 at 23° C. and 50% relative humidity. The results are presented in Table 9.

TABLE 9

| | A | B | C | D |
|---|---|---|---|---|
| polyaziridine content (wt %) | 0.00 | 0.42 | 0.84 | 1.24 |
| set-to-touch time (hours) | 2.00 | 0.25 | 0.50 | 0.30 |
| hard-dry time (hours) | 7.00 | 3.00 | 2.75 | 0.55 |
| percentage decrease in set-to-touch time | — | 87.5 | 75.0 | 85.0 |
| percentage decrease in hard-dry time | — | 57.1 | 60.7 | 92.1 |

The addition of polyaziridines generally increased the cure rate of the two-component waterborne polyurethane dispersion coating composition as evidenced by the decreased times for set-to-touch and hard-dry when compared to the composition with zero polyaziridine.

Example 4

Four (4) two-component waterborne polyurethane dispersion coating compositions were prepared. Three (3) of the compositions included 1.24-1.25 percent polyaziridine. The three (3) compositions containing polyaziridine comprised a combination of two different polyaziridines in different relative weight ratios. The compositions were formed from the raw material formulations listed in Table 10 (weight percentages based on the total weight of the compositions).

TABLE 10

| Raw Material | A | B | C | D |
|---|---|---|---|---|
| Bayhydrol ® XP 2542 | 46.88 | 46.29 | 46.29 | 46.29 |
| PFAZ ™ 322 | 0.00 | 1.25 | 0.62 | 0.00 |
| XAMA ® 220 | 0.00 | 0.00 | 0.62 | 1.25 |
| Baysilone ® Paint Additive VP AI 3468 | 0.32 | 0.32 | 0.32 | 0.32 |
| DSX ® 1514 (8% in DI water) | 2.28 | 2.25 | 2.25 | 2.25 |
| Tego ® Foamex 822 | 0.14 | 0.14 | 0.14 | 0.14 |
| Water, DI | 9.61 | 9.49 | 9.49 | 9.49 |
| Bayhydur ® XP 2547 | 40.78 | 40.27 | 40.27 | 40.27 |

The compositions were formed by introducing the raw materials into a mixing vessel in the order listed in Table 10. The Bayhydua XP 2547 hardener/crosslinker was added to the mixtures including the Bayhydrol® XP 2542 binder, the PFAZ™ 322 and/or XAMA® 220 polyaziridines, and the auxiliary agents/additives shortly before application of the compositions. The compositions exhibited the properties listed in Table 11.

TABLE 11

| Property | A | B | C | D |
|---|---|---|---|---|
| % NCO | 6.25 | 6.17 | 6.17 | 6.17 |
| Mix ratio (vol) | 1.60:1 | 1.55:1 | 1.55:1 | 1.55:1 |
| NCO: OH | 3.00 | 3.00 | 3.00 | 3.00 |
| P/B | 0 | 0 | 0 | 0 |
| PVC | 0 | 0 | 0 | 0 |
| VOC (lbs/gal) | 1.25 | 1.23 | 1.23 | 1.23 |
| Volume solids (%) | 62.66 | 63.13 | 63.12 | 63.13 |
| Weight solids (%) | 65.94 | 66.37 | 66.36 | 66.37 |
| Weight/volume (lbs/gal) | 9.13 | 9.13 | 9.13 | 9.13 |

The compositions were drawn down on glass substrates after an MEK wipe. The Gardner Circular Drytimes (set-to-touch and hard-dry) were measured according to ASTM D 5895 at 23° C. and 50% relative humidity. The results are presented in Table 12.

TABLE 12

| | A | B | C | D |
|---|---|---|---|---|
| polyaziridine content (weight ratio of TTMAP:TTAP) | 0:0 | 1.25:0 | 0.62:0.62 | 0:1.25 |
| set-to-touch time (hours) | 2.00 | 0.25 | 0.30 | 0.20 |
| hard-dry time (hours) | 7.00 | 0.65 | 0.55 | 0.50 |
| percentage decrease in set-to-touch time | — | 87.5 | 85 | 90 |
| percentage decrease in hard-dry time | — | 90.7 | 92.1 | 92.9 |

The addition of polyaziridines generally increased the cure rate of the two-component waterborne polyurethane dispersion coating composition as evidenced by the decreased times for set-to-touch and hard-dry when compared to the composition with zero polyaziridine.

Example 5

Three (3) two-component waterborne polyurethane dispersion coating compositions were prepared. Two (2) of the compositions included 1.04 percent polyaziridine. The two (2) compositions containing polyaziridine comprised a combination of two different polyaziridines in different relative weight ratios. The compositions were formed from the raw material formulations listed in Table 13 (weight percentages based on the total weight of the compositions).

TABLE 13

| Raw Material | A | B | C |
|---|---|---|---|
| Bayhydrol ® XP 2542 | 46.88 | 46.39 | 46.39 |
| PFAZ ™ 322 | 0 | 0.83 | 0.21 |
| XAMA ® 220 | 0 | 0.21 | 0.83 |
| Baysilone ® Paint Additive VP AI 3468 | 0.32 | 0.32 | 0.32 |
| DSX ® 1514 (8% in DI water) | 2.28 | 2.26 | 2.26 |
| Tego ® Foamex 822 | 0.14 | 0.14 | 0.14 |
| Water, DI | 9.61 | 9.51 | 9.51 |
| Bayhydur ® XP 2547 | 40.78 | 40.35 | 40.35 |

The compositions were formed by introducing the raw materials into a mixing vessel in the order listed in Table 13. The Bayhydur® XP 2547 hardener/crosslinker was added to the mixtures including the Bayhydrol® XP 2542 binder, the PFAZ™ 322 and XAMA® 220 polyaziridines, and the auxiliary agents/additives shortly before application of the compositions. The compositions exhibited the properties listed in Table 14.

TABLE 14

| Property | A | B | C |
|---|---|---|---|
| % NCO | 6.25 | 6.19 | 6.19 |
| Mix ratio (vol) | 1.60:1 | 1.56:1 | 1.56:1 |
| NCO: OH | 3.00 | 3.00 | 3.00 |
| P/B | 0 | 0 | 0 |
| PVC | 0 | 0 | 0 |
| VOC (lbs/gal) | 1.25 | 1.23 | 1.23 |
| Volume solids (%) | 62.66 | 63.05 | 63.05 |
| Weight solids (%) | 65.94 | 66.29 | 66.29 |
| Weight/volume (lbs/gal) | 9.13 | 9.13 | 9.13 |

The compositions were drawn down on glass substrates after an MEK wipe. The Gardner Circular Drytimes (set-to-touch and hard-dry) were measured according to ASTM D 5895 at 23° C. and 50% relative humidity. The results are presented in Table 15.

TABLE 15

| | A | B | C |
|---|---|---|---|
| polyaziridine content (weight ratio of PFAZ:XAMA) | 0:0 | 0.83:0.21 | 0.21:0.83 |
| set-to-touch time (hours) | 2.00 | 0.20 | 0.25 |
| hard-dry time (hours) | 7.00 | 0.50 | 2.00 |
| percentage decrease in set-to-touch time | — | 90.0 | 87.5 |

TABLE 15-continued

|  | A | B | C |
|---|---|---|---|
| percentage decrease in hard-dry time | — | 92.9 | 71.4 |

The addition of polyaziridines generally increased the cure rate of the two-component waterborne polyurethane dispersion coating composition as evidenced by the decreased times for set-to-touch and hard-dry when compared to the composition with zero polyaziridine.

Example 6

Five (5) two-component waterborne polyurethane dispersion coating compositions were prepared. The five (5) compositions included 0.92-0.94 percent polyaziridine. The compositions each included zero percent or 2.14 percent of different co-solvents. The compositions were formed from the raw material formulations listed in Table 16 (weight percentages based on the total weight of the compositions).

TABLE 16

| Raw Material | A | B | C | D | E |
|---|---|---|---|---|---|
| Bayhydrol ® XP 2542 | 45.44 | 45.44 | 45.44 | 45.44 | 46.43 |
| PFAZ ™ 322 | 0.92 | 0.92 | 0.92 | 0.92 | 0.94 |
| Baysilone ® Paint Additive VP AI 3468 | 0.31 | 0.31 | 0.31 | 0.31 | 0.32 |
| DSX ® 1514 (8% in DI water) | 2.21 | 2.21 | 2.21 | 2.21 | 2.26 |
| Tego ® Foamex 822 | 0.14 | 0.14 | 0.14 | 0.14 | 0.14 |
| Acetone | 2.14 | 0 | 0 | 0 | 0 |
| Butyl carbitol | 0 | 0 | 0 | 2.14 | 0 |
| Exxate ™ 600 * | 0 | 2.14 | 0 | 0 | 0 |
| PM acetate ** | 0 | 0 | 2.14 | 0 | 0 |
| Water, DI | 9.32 | 9.32 | 9.32 | 9.32 | 9.52 |
| Bayhydur ® XP 2547 | 39.53 | 39.53 | 39.53 | 39.53 | 40.39 |

\* hexyl acetate mixture available from Exxon Mobile Chemicals
\*\* propylene glycol monomethyl ether acetate The compositions were formed by introducing the raw materials into a mixing vessel in the order listed in Table 16. The Bayhydur® XP 2547 hardener/crosslinker was added to the mixtures including the Bayhydrol® XP 2542 binder, the PFAZ™ 322 polyaziridine, and the auxiliary agents/additives shortly before application of the compositions. The compositions exhibited the properties listed in Table 17.

TABLE 17

| Property | A | B | C | D | E |
|---|---|---|---|---|---|
| % NCO | 6.06 | 6.06 | 6.06 | 6.06 | 6.19 |
| Mix ratio (vol) | 1.45:1 | 1.46:1 | 1.47:1 | 1.47:1 | 1.57:1 |
| NCO: OH | 3.00 | 3.00 | 3.00 | 3.00 | 3.00 |
| P/B | 0 | 0 | 0 | 0 | 0 |
| PVC | 0 | 0 | 0 | 0 | 0 |
| VOC (lbs/gal) | 0.07 | 0.37 | 0.37 | 0.37 | 0.07 |
| Volume solids (%) | 61.15 | 61.33 | 61.49 | 61.46 | 63.01 |
| Weight solids (%) | 64.84 | 64.84 | 64.84 | 64.84 | 66.25 |
| Weight/volume (lbs/gal) | 9.06 | 9.09 | 9.11 | 9.1 | 9.13 |

The compositions were drawn down on glass substrates after an MEK wipe. The Gardner Circular Drytimes (set-to-touch and hard-dry) were measured according to ASTM D 5895 at 23° C. and 50% relative humidity. The results are presented in Table 18.

TABLE 18

|  | A | B | C | D | E |
|---|---|---|---|---|---|
| solvent | acetone | Exxate 600 | PM acetate | butyl carbitol | none |
| set-to-touch time (hours) | 0.15 | 0.25 | 0.25 | 0.30 | 0.23 |
| hard-dry time (hours) | 0.50 | 0.60 | 0.65 | 0.95 | 0.75 |

The addition of various co-solvents did not seem to substantially affect the increase in cure rate resulting from the addition of polyaziridine.

Example 7

Three (3) two-component waterborne polyurethane dispersion coating compositions were prepared. The three (3) compositions included 0.50-0.51 percent polyaziridine. The compositions each included zero percent or 2.14 percent of different co-solvents. The compositions were formed from the raw material formulations listed in Table 19 (weight percentages based on the total weight of the compositions).

TABLE 19

| Raw Material | A | B | C |
|---|---|---|---|
| Bayhydrol ® XP 2542 | 46.63 | 46.63 | 46.63 |
| PFAZ ™ 322 | 0.51 | 0.50 | 0.50 |
| Baysilone ® Paint Additive VP AI 3468 | 0.32 | 0.31 | 0.31 |
| DSX ® 1514 (8% in DI water) | 2.27 | 2.22 | 2.22 |
| Tego ® Foamex 822 | 0.14 | 0.14 | 0.14 |
| Dowanol ™ DPnB * | 0.00 | 0.00 | 2.14 |
| Water, DI | 0.00 | 2.14 | 0.00 |
| Xylene | 9.56 | 9.36 | 9.36 |
| Bayhydur ® XP 2547 | 40.57 | 39.7 | 39.7 |

\* Dipropylene Glycol n-Butyl Ether; major isomer: $C_4H_9O[CH_2CH(CH_3)O]_2H$; available from Dow Chemical Company The compositions were formed by introducing the raw materials into a mixing vessel in the order listed in Table 19. The Bayhydur® XP 2547 hardener/crosslinker was added to the mixtures including the Bayhydrol® XP 2542 binder, the PFAZ™ 322 polyaziridine, and the auxiliary agents/additives shortly before application of the compositions. The compositions exhibited the properties listed in Table 20.

TABLE 20

| Property | A | B | C |
|---|---|---|---|
| % NCO | 6.22 | 6.09 | 6.09 |
| Mix ratio (vol) | 1.58:1 | 1.48:1 | 1.48:1 |
| NCO: OH | 3.00 | 3.00 | 3.00 |
| P/B | 0 | 0 | 0 |
| PVC | 0 | 0 | 0 |
| VOC (lbs/gal) | 0.07 | 0.37 | 0.37 |
| Volume solids (%) | 62.85 | 61.15 | 61.23 |
| Weight solids (%) | 66.11 | 64.69 | 64.69 |
| Weight/volume (lbs/gal) | 9.13 | 9.08 | 9.09 |

The compositions were drawn down on glass substrates after an MEK wipe. The Gardner Circular Drytimes (set-to-touch and hard-dry) were measured according to ASTM D 5895 at 23° C. and 50% relative humidity. The results are presented in Table 21.

TABLE 21

|  | A | B | C |
|---|---|---|---|
| solvent | none | xylene | Dowanol DpnB |
| set-to-touch time (hours) | 0.25 | 0.25 | 0.25 |
| hard-dry time (hours) | 1.75 | 1.35 | 2.50 |

The addition of various co-solvents did not seem to substantially affect the increase in cure rate resulting from the addition of polyaziridine.

The present disclosure has been written with reference to certain exemplary, illustrative, and non-limiting embodiments. However, it will be recognized by persons having ordinary skill in the art that various substitutions, modifications or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining, modifying, or reorganizing any of the disclosed steps, ingredients, constituents, components, elements, features, aspects, and the like, of the embodiments described herein, in any manner that persons having ordinary skill in the art may find useful. Thus, this disclosure is not limited by the description of the exemplary and illustrative embodiments.

What is claimed is:

1. A process for increasing the cure rate of a two-component waterborne polyurethane dispersion coating, comprising:
   introducing a polyaziridine into a coating system comprising:
   a hydrophilically-modified water-dispersible polyisocyanate;
   a polyol dispersed in water, optionally, in the presence of one or more organic solvents; and optionally, one or more additives or auxiliary agents; wherein the quantity of polyaziridine introduced comprises 0.42 to 0.85 percent by weight of the coating system and the introduction of the polyaziridine decreases the time-to-cure by at least 35 percent.

2. The process of claim 1, wherein the introduction of the polyaziridine decreases the time-to-cure by at least 90 percent.

3. The process of claim 1, wherein the polyaziridine comprises one or more tris-aziridinoproprionate derivatives selected from the group consisting of trimethylolpropane tris-(1-(2-methyl)aziridino)propionate, trimethylolpropane tris-3-(1-aziridinopropionate), pentaerythritol tris-3-(1-aziridinopropionate), and combinations of any thereof.

4. The process of claim 1, wherein:
   the polyisocyanate comprises at least one isocyanurate trimer based on hexamethylene diisocyanate and having at least one 3-(cyclohexyl-amino)-1-propanesulfonic acid or 3-(cyclohexyl-amino)-1-propanesulfonate group covalently linked to the isocyanurate through a urea bond; and
   the polyol comprises a polyacrylic polyol.

5. The process of claim 1, wherein the polyaziridine is introduced into the coating system by mixing with the polyol before introducing the polyisocyanate.

6. The process of claim 1, wherein the polyaziridine is introduced into the coating system by mixing with the polyisocyanate before introducing the polyol.

7. The process of claim 1, wherein the polyaziridine is introduced into the coating system by mixing after the polyisocyanate and the polyol are mixed.

8. A two-component waterborne polyurethane dispersion coating system comprising:
   a hydrophilically-modified water-dispersible polyisocyanate;
   a polyol dispersed in water, optionally, in the presence of one or more organic solvents;
   a polyaziddine in the quantity of 0.42 to 0.85 percent by weight of the coating system; and optionally, one or more additives or auxiliary agents;
   wherein a time-to-cure of the coating system is decreased by at least 35 percent.

9. The coating system of claim 8, wherein the quantity of polyaziridine is 0.65 to 0.85 percent by weight of the coating system.

10. The coating system of claim 8, wherein the time-to-cure is decreased by at least 90 percent.

11. The coating system of claim 8, wherein the polyaziridine comprises one or more tris-aziridinoproprionate derivatives selected from the group consisting of trimethylolpropane tris-(1-(2-methyl)aziridino)propionate, trimethylolpropane tris-3-(1-aziridinopropionate), pentaerythritol tris-3-(1-aziridinopropionate), and combinations of any thereof.

12. The coating system of claim 8, wherein:
   the polyisocyanate comprises at least one isocyanurate trimer based on hexamethylene diisocyanate and having at least one 3-(cyclohexyl-amino)-1-propanesulfonic acid or 3-(cyclohexyl-amino)-1-propanesulfonate group covalently linked to the isocyanurate through a urea bond; and the polyol comprises a polyacrylic polyol.

13. A process for preparing a coating composition from the coating system of claim 8, comprising mixing the polyaziridine with the polyol and any auxiliary agents or additives, and then mixing in the polyisocyanate to form the coating composition.

14. A process for preparing a coating composition from the coating system of claim 8, comprising mixing the polyaziridine with the polyisocyanate, and then mixing the combined polyaziridine and polyisocyanate with a mixture comprising the polyol and any auxiliary agents or additives to form the coating composition.

15. A process for preparing a coating composition from the coating system of claim 8, comprising mixing the polyol, any auxiliary agents or additives, and the polyisocyanate to form the coating composition, and then mixing the polyaziridine into the coating composition.

16. A coating composition prepared from the coating system of claim 8.

17. A substrate coated with a coating composition prepared from the coating system of claim 8.

18. The process of claim 1, wherein the quantity of polyaziridine introduced comprises 0.65 to 0.85 percent by weight of the coating system.

* * * * *